Feb. 10, 1970   TADAO FUJIMOTO   3,494,506
AUTOMATIC GAS FILLING DEVICE OF AN
INFLATABLE LIFESAVING EQUIPMENT
Filed Dec. 5, 1967   2 Sheets-Sheet 1

United States Patent Office 3,494,506
Patented Feb. 10, 1970

3,494,506
AUTOMATIC GAS FILLING DEVICE OF AN INFLATABLE LIFESAVING EQUIPMENT
Tadao Fujimoto, 1–20 Aburatsucho, Miyazaki-ken, Nichinan-shi, Japan
Filed Dec. 5, 1967, Ser. No. 688,126
Claims priority, application Japan, Dec. 8, 1966, 41/80,764; May 17, 1967, 42/55,999; Aug. 31, 1967, 42/56,000; Oct. 24, 1967, 42/68,184; Oct. 27, 1967, 42/68,972; Nov. 1, 1967, 42/70,063, 42/70,064
Int. Cl. B67b 7/24
U.S. Cl. 222—5                                    2 Claims

ABSTRACT OF THE DISCLOSURE

A gas filling device attached to an inflatable lifesaving equipment characterized by filling gas automatically from a gas cylinder of the device into a sack of the lifesaving equipment when the equipment is immersed in the water. The device is provided with a restricting mechanism comprising a restricting member made of a material which loses its dimensional structure in the water, thereby the restriction on the gas filling action of the device is removed only when the mechanism is wetted with water.

---

Figure 1:
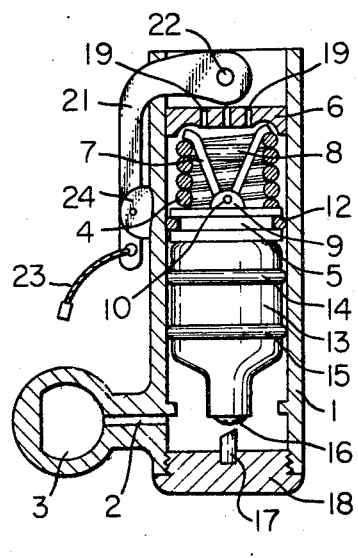

The present invention relates to a gas filling device used for filling gas automatically into an inflatable lifesaving equipment when the equipment is immersed in the water, and is a related application to the application filed together with the present invention by the same applicant under the title "An Improved Automatic Gas Filling Device of an Inflatable Lifesaving Equipment."

The operation and the mechanical features of the device of the related application as a whole will now be briefly described.

The device disclosed in the related application is provided with a gas cylinder for containing gas to be filled into a sack of a lifesaving equipment and the gas cylinder is provided with a sealed gas outlet. A seal cutter is disposed in a casing of the device in a facing condition with the sealed gas outlet of the gas cylinder at a fixed distance, and a spring is also disposed within the casing in such a manner that the spring puts the seal cutter into a piercing condition with the sealed outlet of the gas cylinder by free expansion of the spring. The spring is provided with a restricting mechanism for restricting free expansion of the spring under a dry condition while releasing the restriction in the water, and the restricting mechanism comprises a restricting member made of a material which loses its strength and is broken by the expanding force of the spring in the water. When the lifesaving equipment is immersed in the water, the above-described restriction on the free expansion of the spring is removed because the restricting member is broken by wetting with water. Then the seal cutter is put into a piercing condition with the sealed gas outlet of the gas cylinder by the free expansion of the spring. Consequently, gas is automatically filled into the sack of the lifesaving equipment from the gas cylinder when the lifesaving equipment is immersed in the water.

While the principal mechanism and the operation of the device of the present invention is almost the same with those of the above-described related application, the device of the present invention is characterized by comprising a restricting mechanism provided with a restricting member made of materials which can withstand the expanding force of a spring under a dry condition but loses the three dimensional structure and collapses by the expanding force of the spring in the water. As a material having such a property, calcium carbonate, magnesium carbonate, calcium sulfate, clay, gypsum, sugar or salt can be used for the restricting member of the present invention.

The principal object of the present invention is to provide an improved gas filling device attached to an inflatable lifesaving equipment which fills gas from a gas cylinder of the device into a sack of the lifesaving equipment without manual operation when the equipment is immersed in the water.

The other object of the present invention is to provide an improved automatic gas filling device attached to an inflatable lifesaving equipment which is useful especially under a situation when it is impossible or very difficult to inflate the equipment manually.

Still another object of the present invention is to provide an improved automatic gas filling device which can be attached to the conventional lifesaving equipment without modification.

Further features and advantages of the present invention will be apparent from the ensuing descriptions, reference being made to the accompanying drawings.

Figure 2A:
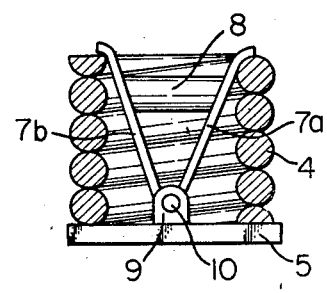
Figure 2B:
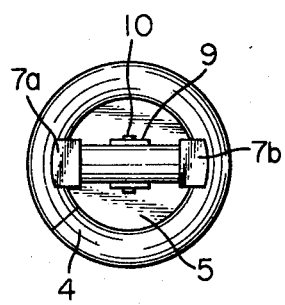
Figure 3:
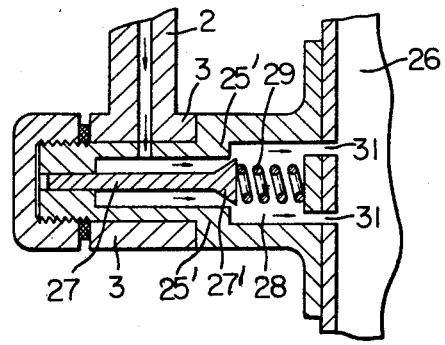
Figure 4:
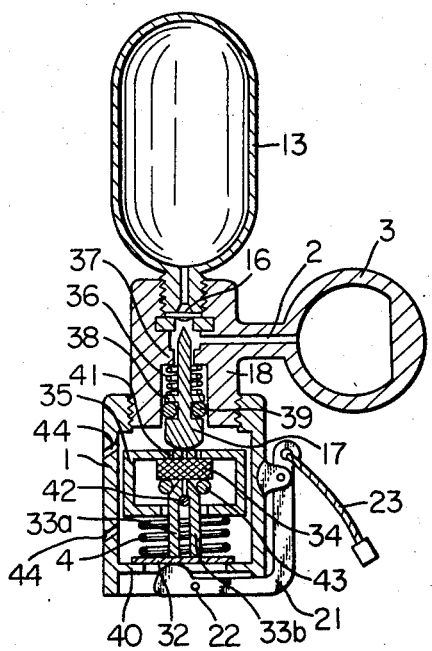
Figure 5:
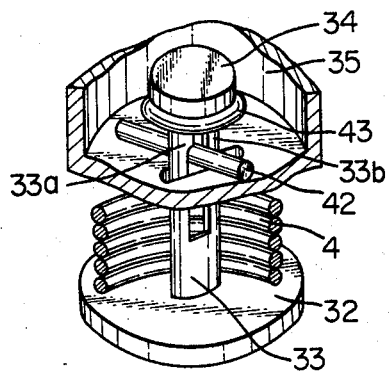

FIG. 1 is a side view, partly in section, of an embodiment of a gas filling device of the present invention, FIGS. 2A and 2B are enlarged side and plan view of an assemblage for restricting free expansion of a spring in the embodiment shown in FIG. 1, FIG. 3 is a sectional side view for showing an attached condition of the device of the present invention with a lifesaving equipment, FIG. 4 is a side view, partly in section, of another embodiment of a gas filling device of the present invention, FIG. 5 is an enlarged perspective view, partly taken off for showing the mechanism, of an assemblage for restricting free expansion of a spring in the embodiment shown in FIG. 4.

Referring to FIG. 1, an embodiment of the gas filling device of the present invention is shown. Main elements of the device of the present invention are all contained in a cylindrical casing 1, which is connected to a gas inlet portion (not shown) of a sack of the lifesaving equipment by connecting pipes 2 and 3. A spring 4 is disposed within the casing 1 usually maintained in a compressed condition between a sliding member 5 and a stop plate 6 secured to the casing 1. The compressed condition of the spring 4 is maintained by a V-shaped engaging member 7 and a restricting member 8 disposed to the engaging member 7. The assembled condition of the engaging member 7 with other elements of the device is shown in detail in FIGS. 2A and 2B. The V-shaped engaging member 7 is firmly disposed to the supporting bracket 9 of the sliding member 5 at its apex portion 10, and the end portions of the two arms 7a and 7b of the V-shaped engaging member 7 extend outwardly and are positioned over the end portion of the spring 4 adjacent to the stop plate 6. The length of the two arms 7a and 7b and the included angle between the arms should be designed so that the spring 4 may be put in a compressed condition when the end portions of the arms 7a and 7b are placed over the end portion of the spring 4 as above described. In this arrangement, the included angle between the two arms 7a and 7b have a tendency to become smaller on account of the expanding force of the compressed spring 4. In order to prevent this and keep the included angle between the two arms 7a and 7b against the expanding force of the spring 4, a restricting member 8 is disposed between the two arms 7a and 7b adjacent to their diverged end portions as shown in the drawings. As already mentioned, the restricting member 8 is made of a material which can withstand the expanding force provided by the spring 4 in the above described arrangement so as to maintain the spring 4 in a compressed condition under a dry condition but loses its three dimensional structures and collapses by the expanding force of the spring 4 or it melts away so as to release the restriction on the engaging member 7, that is on the spring 4, in the water. The sliding member 5 is slidably disposed within the casing 1 by an O-ring 12, one surface of which contacts the spring 4 as above-described and the other surface of which contacts the bottom of a gas cylinder 13. The gas cylinder 13 is also slidably disposed within the casing 1 by a pair of packings 14 and 15 in such a manner that a sealed gas outlet 16 of the gas cylinder 13 faces a seal cutter 17 at a definite intervening distance which is secured to a covering 18 of the casing 1. Under the usual situation, in other words when no special force is loaded on the gas cylinder 13, the sealed gas outlet 16 is kept away from the seal cutter 17 on account of the frictional resistance between the packings 14, 15 and the inside surface of the casing 1. One end portion of the casing 1 adjacent to the stop plate 6 is opened so as to introduce water inside the casing 1 through a plurality of apertures 19 formed through the stop plate 6 when the device is immersed in the water.

In the above described mechanical arrangement, when the life-saving equipment provided with the gas filling device of the present invention is immersed in the water, water comes into the inside space of the casing 1 through the apertures 19 of the stop plate 6 and the above-described assemblage comprising the compressed spring 4 is completely wetted with water. Then the restricting member 8 loses its three dimensional structure instantly in the water and collapses to eliminate the restriction on the engaging member 7, that is on the spring 4. Then, as one end portion of the spring 4 is limited by the stop plate 6, the sliding member 5 is pushed and the gas cylinder 13 is moved towards the seal cutter 17 on account of the expansion of the spring 4. When the sealed gas outlet 16 of the gas cylinder 13 arrives at the seal cutter 17, it is pierced by the seal cutter 17. Thus the compressed gas spouts out from the gas cylinder 13 and is filled into the sack of the life-saving equipment through the connecting pipes 2 and 3. As already described, the inside space of the casing 1 is isolatedly separated into two rooms by the sliding member 5 and the O-ring 12, one room being for gas and the other being for water. So, gas within the gas room does not leak into the water room, while water in the water room does not permeate into the gas room.

Auxiliary elements are also disposed to the device for the sake of manual operation of the device which will be useful when filling gas into the lifesaving equipment before the equipment is immersed in the water. An L-shaped lever 21 is pivotally disposed to the shaft 22, which is secured to the casing 1, at its one end portion. The other end portion of the lever 21 is provided with an operating cord 23, and the lever 21 is usually held by a bracket 24 secured to the casing 1 in such a manner that the bracket 24 nips the lever 21 pressingly from both sides. When the operating cord 23 is pulled against the restriction by the bracket 24, the end portion of the lever 21 turns around the supporting shaft 22. Then the larger diametrical end portion of the lever 21 comes in contact with the stop plate 6. Consequently, the assemblage comprising the spring 4 is pushed otgether with the gas cylinder 13 toward the seal cutter 17 and the sealed gas outlet 16 of the gas cylinder 13 is pierced by the seal cutter 17 so as to make gas spout out of the cylinder 13.

The gas filling device of the present device is usually attached to the lifesaving equipment in a manner shown in FIG. 3, wherein the connecting pipe 3 of the gas filling device is firmly attached to an inlet device 25 of the sack 26 of the lifesaving equipment. A movable valve 27 is disposed within the inside hollow 28 of the inlet device 25 in such a manner that the diverged end portion 27' of the valve 27 is always pressed against the stepped portion 25' of the inlet device 25 by a spring 29 as shown in the drawing. Another end of the valve 27 is slidably inserted into the smaller diametrical portion of the hollow 28.

In the above mentioned mechanical arrangement, gas which spouts out of the gas cylinder 13 is conducted into the space defined by the small diametrical inside wall of the inlet device 25 and the diverged end portion 27' of the valve 27. When the pressure of the valve 27 due to the conducted gas overcomes the load on the valve 27 by the spring 29, the spring 29 is displaced so as to form a slight clearance between the valve 27 and the stepped portion 25' of the inlet device 25, and the gas comes into the space of the larger inside diameter passing through the clearance and further into the sack 26 through the apertures 31 as indicated by arrows in the drawing. When almost all of the gas has been filled into the sack and the back pressure of the valve 27 has increased, the diverged end 27' of the valve 27 is again pressed against the stepped portion 25' of the inlet device by the spring 29, and the back-flowing of the gas into the filling device from the sack 26 can effectively be prevented.

Another embodiment of the present invention is shown in FIG. 4, wherein the gas cylinder 13 is secured to the cover 18 of the casing 1 and the seal cutter 17 is slidably disposed within a vertical bore of the cover 18 in such a manner that the top end portion of the seal cutter 17 faces the sealed gas outlet 16 of the gas cylinder 13. The assemblage comprising the spring 4, a spring receiver 32, a pen point-shaped engaging member 33, a restricting member 34 and an inner casing 35 is placed within the casing 1 between the bottom of the seal cutter 17 and the end portion of the casing 1 opposite the cover 18. The seal cutter 17 is slidably inserted into a bore drilled through the cover 18 of the casing 1, and a spring 36 for keeping the top end portion of the seal cutter 17 away from the sealed gas outlet 16 of the gas cylinder 13 is positioned between the inwardly extended finage 37 of the cover 18 and the flange 38 of the seal cutter 17. An O-ring 39 is positioned between the flange 38 and the bottom portion of the seal cutter 17 so as to prevent leakage of gas or permeation of water. One end portion of the pen point-shaped engaging member 33 is secured to the spring receiver 32 by the flange 40 of the casing 1, and another separated end portion 33a and 33b of the engaging member 33 is inserted into the inner casing 35 through the aperture 41 formed through the surface of the inner casing 35.

The assembled condition of the engaging member 33 with other neighbouring elements is shown in detail in FIG. 5. Inside the inner casing 35, a bar 42 is transversely disposed passing through the clearance between the pair of separated end portions 33a and 33b. The top end portions 33a and 33b of the engaging member 33 are put in a mutually closed condition by a stopper ring 43 and the restricting member 34 is positioned between the stopper ring 43 and the inside wall of the inner casing 35. The length of the engaging member 33 should be designed so that the spring 4 is usually maintained in a compressed condition between the spring receiver 32 and the inner casing 35. A plurality of apertures 44 are formed through the inner casing 35 at the portion where it contacts the restricting member 34.

In the above-described mechanical arrangement, the spring 4 is effectively maintained in a compressed condition between the spring receiver 32 and the inner casing 35 because the displacement of the inner casing 35 is limited by the presence of the restricting member 34 and the bar 42. The restricting member 34 used in the present embodiment is made of the same material as used for the preceding embodiment. When the lifesaving equipment is immersed in the water, water is introduced into the inner casing 35 through the apertures 44 formed through the casing 1 and the apertures 41 formed through the inner casing 35, and the restricting member 34 becomes wet with water. As it is apparent from the preceding description, the bar 42 is always pressed against the separated end portions 33a and 33b towards the restricting member 34 by the expanding force of the spring 4, so the respective end portions 33a and 33b are always loaded in such a manner that they are kept away from each other against the restriction by the stopper ring 43 and the restricting member 34. Consequently, when the restricting member 34 has been wetted with water and its three dimensional structure has been lost by collapsing, the stopper ring 43 is drived out from the engaging condition with the end portions 33a and 33b, the top end portions 33a and 33b are moved apart by the bar 42 pushed vertically towards the stopper ring 43 by the expanding force of the spring 4, the bar 42 is driven out from between the end portions 33a and 33b by being pushed by the spring 4, and the spring 4 expands freely and pushes the inner casing 35 together with the seal cutter 17 towards the sealed gas outlet 16 of the gas cylinder 13. Piecing of the seal 16 by the seal cutter 17 and the introduction of spouted gas into the sack of the lifesaving equipment is carried out in the same manner as in the preceding embodiments. The present embodiment is also provided with auxiliary elements for manual operation.

While the invention has been described in conjunction with certain embodiments thereof, it is to be understood that various modifications and changes may be made without departing from the spirit and scope of the invention.

What is claimed is:

1. An automatic gas filling device of a lifesaving equipment, comprising in combination, a casing, a gas cylinder disposed in said casing of said gas filling device and provided with a sealed gas outlet, a seal cutter disposed within said casing in a facing condition with said sealed gas outlet of said gas cylinder at a fixed intervening distance, a compressed spring disposed within said casing in such a manner that said spring puts said seal cutter into a piercing condition with said sealed gas outlet of said gas cylinder, a restricting mechanism disposed restricting said spring in such a manner that said restricting mechanism restricts free expansion of said spring under a dry condition while it releases the restriction in water, thereby gas contained within said gas cylinder is filled into said lifesaving equipment through a connecting pipe connecting said device and said lifesaving equipment when said life-saving equipment is immersed in the water, said restricting mechanism comprising a sliding member disposed between one end portion of said spring and a bottom portion of said gas cylinder, a V-shaped engaging member secured to said sliding member at an apex portion of said V-shaped engaging member in such a manner that two separated ends of said V-shaped engaging member are positioned over the other end portion of said spring, and a restricting member disposed between said two separated end portions of said V-shaped engaging member.

2. An automatic gas filling device according to claim 1, wherein said restricting mechanism comprises, a spring receiver positioned at one end portion of said spring, a pen point-shaped engaging member secured to said spring receiver at one end portion of said engaging member in such a manner that a pair of separated end portions of said engaging member are inserted into an inner casing of said device, a bar transversely disposed within said casing passing through a clearance between said pair of separated end portions, a stopper ring disposed to said separated end portions of said engaging member in such a manner that said stopper ring surrounds said pair of separated end portions of said engaging member, a restricting member disposed between said end portions of said engaging member and an inner surface of said inner casing.

References Cited
UNITED STATES PATENTS

| | | | |
|---|---|---|---|
| 1,367,225 | 2/1921 | Barker | 222—5 |
| 2,894,658 | 7/1959 | Spidy | 222—5 |
| 2,964,050 | 12/1960 | Novak | 9—317 X |
| 3,242,514 | 3/1966 | Waters | 9—318 |
| 3,127,624 | 4/1964 | Kubit et al. | 222—5 X |
| 3,298,571 | 1/1967 | Novak | 222—5 |
| 3,048,303 | 7/1962 | Spidy et al. | 222—5 |

ROBERT B. REEVES, Primary Examiner

H. S. LANE, Assistant Examiner

U.S. Cl. X.R.

9—318